United States Patent [19]

Rau et al.

[11] Patent Number: 5,293,631
[45] Date of Patent: Mar. 8, 1994

[54] ANALYSIS AND OPTIMIZATION OF ARRAY VARIABLES IN COMPILER FOR INSTRUCTION LEVEL PARALLEL PROCESSOR

[75] Inventors: Bantwai R. Rau, Los Altos; Michael Schlansker, Sunnyvale, both of Calif.

[73] Assignee: Hewlett-Packard Company, Palo Alto, Calif.

[21] Appl. No.: 741,292

[22] Filed: Aug. 6, 1991

[51] Int. Cl.$^5$ .............................................. G06F 9/44
[52] U.S. Cl. ..................... 395/700; 364/DIG. 1;
364/280; 364/280.4; 364/280.5; 364/256.3;
364/256.8; 364/247; 364/247.8
[58] Field of Search ......................... 395/700, 650, 375

[56] References Cited

U.S. PATENT DOCUMENTS

| | | | |
|---|---|---|---|
| 4,623,962 | 11/1986 | Matsumoto et al. | 364/200 |
| 4,736,288 | 4/1988 | Shintani et al. | 364/200 |
| 4,833,606 | 5/1989 | Iwasawa et al. | 364/300 |
| 4,866,634 | 9/1989 | Reboh et al. | 364/513 |
| 4,965,724 | 10/1990 | Utsumi et al. | 395/700 |
| 5,067,068 | 11/1991 | Iwasawa et al. | 395/650 |
| 5,088,034 | 2/1992 | Ihara et al. | 395/700 |
| 5,109,331 | 4/1992 | Ishida et al. | 395/375 |
| 5,151,991 | 9/1992 | Iwasawa et al. | 395/700 |
| 5,168,573 | 12/1992 | Fossum et al. | 395/800 |
| 5,179,681 | 1/1993 | Jensen | 395/425 |
| 5,187,789 | 2/1993 | O'Hair | 395/700 |

*Primary Examiner*—Kevin A. Kriess

[57] ABSTRACT

A process for optimizing compiler intermediate representation (IR) code, and data structures for implementing the process; the process is preferably embodied in a compiler computer program operating on an electronic computer or data processor with access to a memory storage means such as a random access memory and access to a program mass storage means such as an electronic magnetic disk storage device. The compiler program reads an input source program stored in the program mass storage means and creates a dynamic single assignment intermediate representation of the source program in the memory using pseudo-machine instructions. To create the dynamic single assignment intermediate representation, during compilation, the compiler creates a plurality of virtual registers in the memory for storage of variables defined in the source program. Means are provided to ensure that the same virtual register is never assigned to more than once on any dynamic execution path. An expanded virtual register (EVR) data structure is provided comprising an infinite, linearly ordered set of virtual register elements with a remap() function defined upon the EVR. Calling the remap() function with an EVR parameter causes an EVR element which was accessible as [n] prior to the remap operation to be accessible as [n+1] after the remap operation. A subscripted reference map comprising a dynamic plurality of map tuples is used. Each map tuple associates the real memory location accessible under a textual name with an EVR element. A compiler can use the map tuple to substitute EVR elements for textual names, eliminating unnecessary load operations from the output intermediate representation.

19 Claims, 6 Drawing Sheets

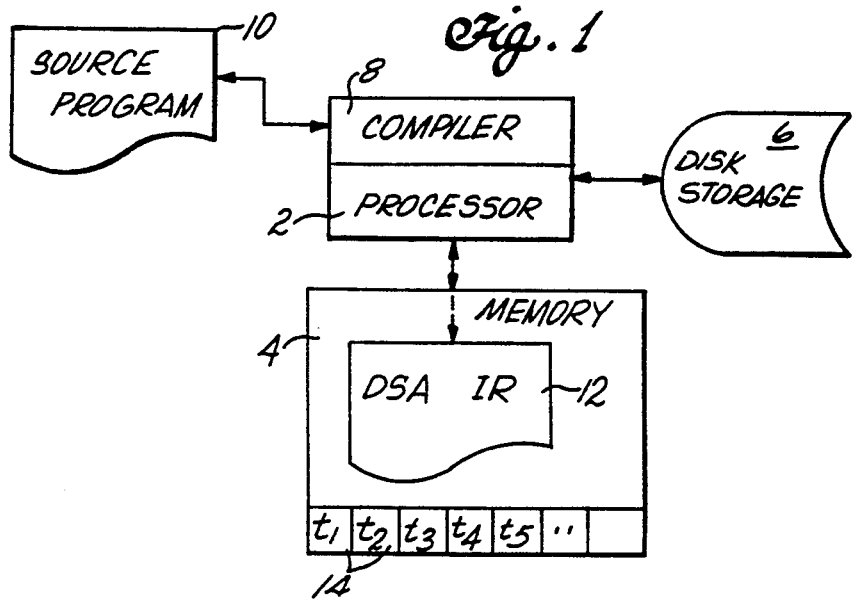

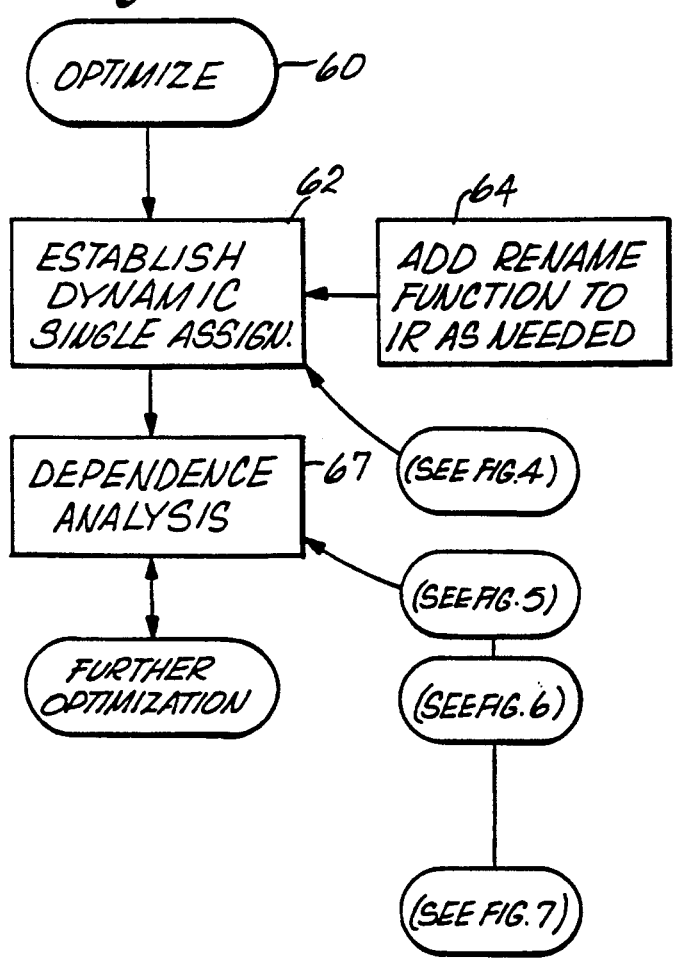

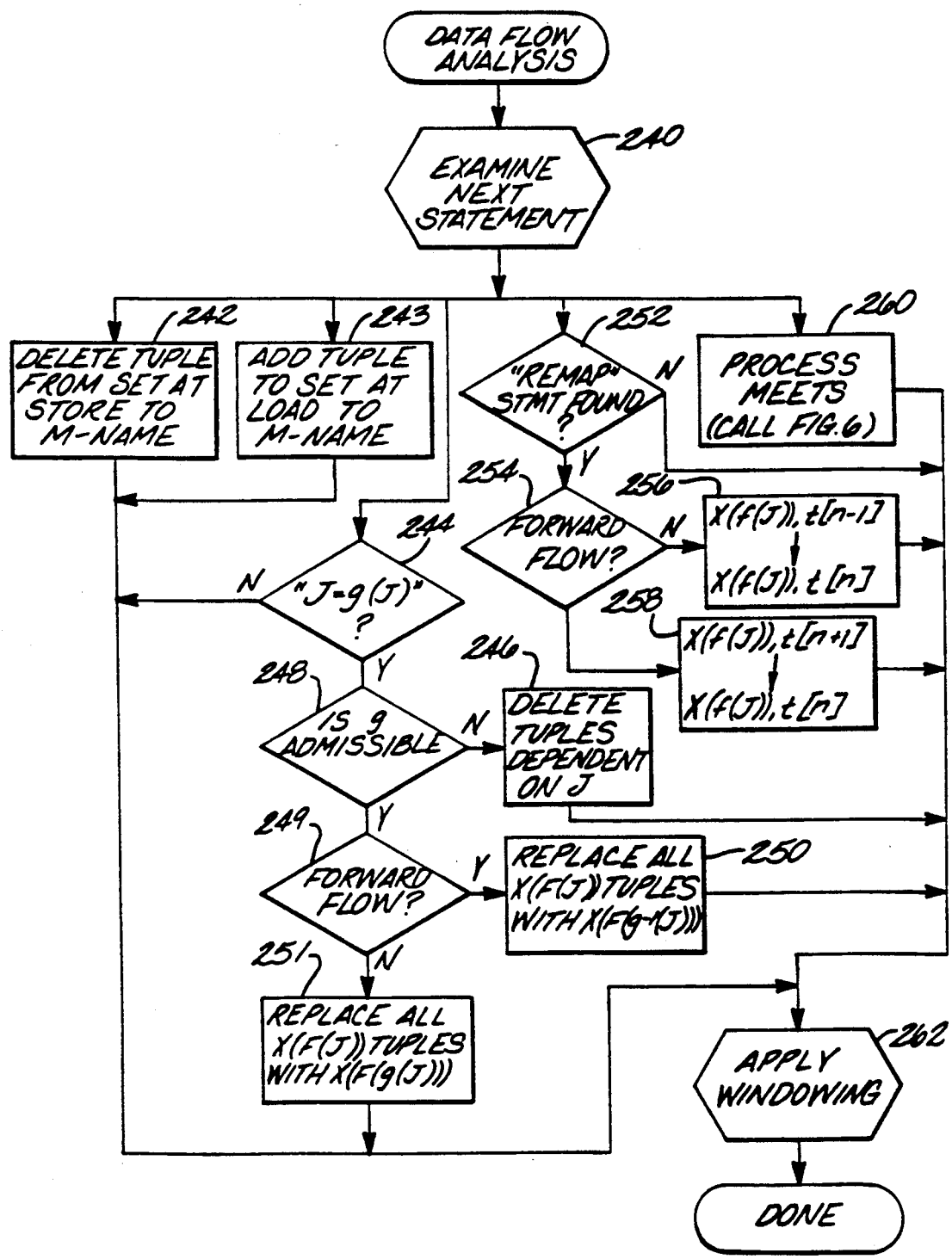

ANALYSIS AND OPTIMIZATION OF ARRAY VARIABLES IN COMPILER FOR INSTRUCTION LEVEL PARALLEL PROCESSOR

FIELD OF THE INVENTION

The present invention generally relates to programming language compilers for electronic computers. The invention specifically relates to methods for optimizing compiler object code in an instruction level parallel processor compiler when the input source code includes a plurality of references to subscripted array variables.

BACKGROUND OF THE INVENTION

The first computers used so-called von Neumann processor architectures, which provide a single instruction stream and a single data stream to a processor. The processor sequentially executes each instruction, acting on data in a single storage area. Such classical processors are known as single instruction single data (SISD) processors. As processor clock speeds have increased, SISD architecture has presented an obstacle to achieving high processing throughput. Many computer programs include groups or blocks of instructions which can be executed in parallel rather than singly. Therefore, computer scientists have developed other architectures, including a family of parallel processing models.

A. Instruction Level Parallel Processors

One type of parallel processor is known as an instruction level parallel (ILP) processor. In an ILP processor, the basic unit of computation (for which scheduling and synchronization decisions are made) is a processor instruction, such as an individual add, multiply, load, or store operation. Non-interdependent instructions are loaded and executed in parallel.

Using ILP processors, instruction scheduling or synchronization decisions need not be made during program execution; some decisions can be made during program compilation. For example, if the compiler can prove that two operations are independent (neither requires the result of the other as input), the operations can be executed in parallel. One way to optimize ILP processor operation is to create a compiler which generates code on the assumption that no run-time decisions are possible; the compiler makes all scheduling and synchronization decisions. Therefore, the processor does little code re-ordering at run time, which improves linking and run speed.

B. Dataflow Processors

Another type of parallel processor is the dataflow processor, which provides maximally parallel program execution. In a dataflow processor, instructions are executed as soon as all required data are available for processing. Dataflow architectures and a compiler for them are described in J. B. Dennis, "First Version of a Data Flow Procedure Language," *Proceedings of Programming Symposium,* Paris 1974, reprinted in *Lecture Notes in Computer Science* 19 (Springer-Verlag, Berlin, 1974), and K. R. Traub, "A Compiler for the MIT Tagged-Token Dataflow Architecture," Technical Report MIT/LCS/TR-370, MIT Laboratory for Computer Science, Cambridge, Mass., August 1986.

C. Vector Processors

Vector processors can also execute parallel programs of a particular form. As is known in the art, vector instructions are equivalent to loops with a single operation in the loop body. For example, a vector accumulation instruction of a vector V $$V := ++1;$$

is equivalent to the pseudocode loop for Index := 1 to VectorLength do
      V[Index]:= ++1.

As a result, object code generation in vector processor compilers is primarily concerned with transforming loop constructs into vector instructions. Optimization of such vector code requires detailed analysis of array subscripts. For example, the compiler must determine if two references are to the same actual memory location, and consolidate the references. A summary of prior art research in vector compilers appears in H. Zima & B. Chapman, *Supercompilers for Parallel and Vector Computers* (ACM Press, Ass'n for Computing Machinery, New York, 1990).

Unfortunately, prior art vector processor compilers have focused on program transformations (such as loop interchange and distribution) rather than on optimization (such as elimination of redundant or partly-redundant array references). For example, the FORTRAN code loop in Code Block 1A contains a redundant load of B(I-1).

---
Code Block 1A

DO 10 I = 2, 50
        A(I) = B(I) + B(I − 1)
  10 CONTINUE

---

A vector compiler does not try to recognize that the two loads of elements of vector B are skewed by one index element, since typical vector processor hardware cannot take advantage of this. However, as is known in the art, an ILP processor is more efficient if the redundant load is eliminated, using code in the form of Code Block 1B.

---
Code Block 1B

T = B(1)
    DO 10 I = 2, 50
        S = B(I)
        A(I) = S + T
        T = S
  10 CONTINUE

---

Using Code Block 1B, an ILP processor can execute the fourth and fifth statements simultaneously, improving performance because there is one less load operation per loop iteration. Thus, vector processor optimizing techniques are not suitable for ILP processors.

D. Disadvantages of the Prior Art

Traditional SISD processors present little opportunity for parallelism in processing or problem-solving. Since most prior compilers have been written for SISD processors, most prior compilers have not provided optimization for parallel processors. On the other hand, most prior compilers can analyze and optimize programs having arbitrary control flow (i.e. GOTO-type branch instructions and unstructured cyclical control flow).

ILP processors and compilers provide control flow which generally proceeds sequentially from one basic object code block to another, as determined by branch instructions. However, an ILP compiler improves scalar performance by providing parallel operation of certain instructions. For example, an ILP compiler can optimize loop constructs by causing parallel execution of a finite number of consecutive instructions at the innermost loop level. For optimization the compiler need only analyze interdependencies between consecutive instructions which are close enough to run in parallel. In particular, the nature of the dependence between two instructions is important only if the dependence might be violated, or a result might be carried in a register from one operation to another.

For example, dependence analysis is different for a code block with a plurality of sibling loops at the same nesting level, such as Code Block 2A, and a loop with a dependent load as shown in Code Block 2B.

| Code Block 2A |
| --- |
| DO 10 I = 1, N |
| X(I + K) = ... [store] |
| 10 CONTINUE |
| : |
| : |
| DO 20 I = 1,N |
| ... = X (I + L) [load] |
| 20 CONTINUE |

| Code Block 2B |
| --- |
| DO 30 I = 1, N |
| 10 ... = X (I + K) [load] |
| : |
| : |
| 20 X(I) = ... [store] |
| 30 CONTINUE |

When compiling the program segment of Code Block 2A, any dependence between the store statement and the load statement of the two loops at statements 10 and 20 is irrelevant. There is no danger that the two loops will be scheduled to execute in reverse order, because ILP compilers preserve the order of the two loops since the loops are basic blocks. Also, optimization is nearly impossible, because unless vector X is known to be small, CPU registers usually have insufficient capacity to hold all the values that were stored by the load operation in the first loop to eliminate the load in the second loop.

Similarly, when compiling the load and store of Code Block 2B, if the load and store operations are spaced far apart in the code, it is irrelevant whether the operations usually are dependent. The distance between the operations ensures that they will not be scheduled in reverse. Thus, the primary concern is whether operations are close in time.

However, performance of an ILP compiler can benefit from partial dependence information. Performance can increase significantly if a compiler can prove that operations in consecutive iterations are independent, even if no proof is available about operations separated by a great number of iterations. This is not true for vectorizing or parallelizing compilers.

For example, in Code Block 2B, assume that the store in statement 20 is dependent on the load in statement 10. If scalar variable K is zero or negative, no recurrence is possible. If K is greater than zero, the load of line 10 in a given iteration of the DO 30 loop is dependent on the store of line 20 that is K iterations earlier. If K is unknown, the worst case (K=1) must be assumed by the compiler, and no overlap of successive iterations is possible. Twice this performance can be achieved if the compiler can prove only that K>1. A conservative assumption is that K=2, which permits successive iterations to be started about twice as frequently.

Unfortunately, ILP architectures are not well suited to conventional high-level computer programming language compilers and compiler optimization techniques. As is known in the art, source language compilers produce an intermediate code before optimization and object code generation, which is known as an intermediate representation (IR). However, most prior art IRs cannot express instruction level parallelism. Moreover, prior art compilers do not provide good optimization of references to subscripted variables.

Conventional compilers and optimizers do not produce maximally efficient code for ILP processors. Therefore, processor and compiler designers would find useful an ILP compiler optimization method which produces maximally efficient ILP processor code for processing references to subscripted array variables.

Such designers would also find useful an optimization method which applies the power of conventional scalar variable techniques to certain classes of programs which contain subscripted references to arrays.

Prior compilers also produce intermediate representations which are not well suited to ILP architectures. Conventional optimizers work well with structured loops but produce poor code when applied to unstructured cyclic constructs, such as loops with embedded conditional branch instructions. Therefore, processor and compiler designers would find useful an optimization method for use with innermost loops having arbitrary, cyclic control flow.

Processor and compiler designers would also appreciate a compiler providing dependence analysis optimized for instruction level parallelism.

Dataflow models provide the basis for creation of IRs well-suited to ILP compilers. However, dataflow IRs must be extended to handle arbitrary, unstructured control flow paths presented in traditional high-level language programs. Moreover, dataflow models require an excessive number of copy operations to enable parallel data usage. Those of skill in the art would find useful an ILP optimization method which removes, using optimization, unnecessary copy operations.

Compiler and processor designers would also find useful an optimization method which can optimize dependencies between operations, including relationships between subscripted memory locations in the presence of arbitrary flow graphs, including loops, and without unnecessary copy operations. Also, it would be advantageous to ensure that primary attention is given to subscripted references.

SUMMARY OF THE INVENTION

Accordingly, the present invention provides a process for optimizing a compiler intermediate representation (IR) for an ILP processor, and data structures for implementing the process. The process is preferably embodied in a compiler computer program operating on an electronic computer or data processor with access to a memory storage means such as a random access memory and access to a program mass storage means such as an electronic magnetic disk storage device. The compiler program reads an input source program stored in the program mass storage means and creates a dynamic single assignment intermediate representation of the source program in the memory using pseudo-machine instructions. To create the dynamic single assignment intermediate representation, during compilation, the compiler creates a plurality of virtual registers in the memory for storage of variables defined in the source program. The process causes the compiler to ensure that the same virtual register is never assigned to more than once on any dynamic execution path, even though the IR code, read literally, could have multiple assignment statements with the same virtual register on the left hand side. The process is implemented using an expanded virtual register (EVR) data structure comprising an infinite, linearly ordered set of virtual register elements with a remap() function defined upon the EVR. Calling the remap() function with an EVR parameter causes an EVR element which was accessible as [n] prior to the remap operation to be accessible as [n+1] after the remap operation. The process causes the processor to create and use a subscripted reference map comprising a dynamic plurality of map tuples. Each map tuple associates the real memory location accessible under a textual name with an EVR element. Thus, a compiler can use the map tuple to substitute EVR elements for textual names, thereby eliminating unnecessary load operations from the output intermediate representation.

BRIEF DESCRIPTION OF THE DRAWINGS

FIG. 1 is a block diagram of a compiler computer program and processor;

FIG. 2A is a block diagram that represents an expanded virtual register (EVR);

FIG. 2B represents values stored by an EVR before and after use of a remap function;

FIG. 3 is a flow diagram of an optimization method of the invention;

FIG. 7 is a flow diagram of a data flow analysis method forming a substep of the method of FIG. 3.

DETAILED DESCRIPTION

Figure 4:
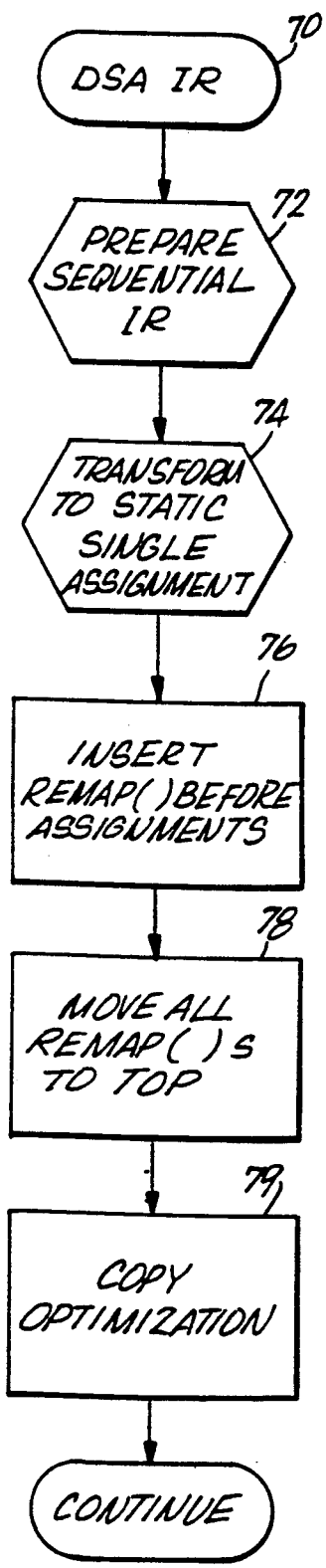
FIG. 4 is a flow diagram of a dynamic single assignment conversion method forming a substep of the method of FIG. 3.

The following detailed description of the preferred embodiments of the invention uses certain specific terminology for the sake of clarity. However, the invention is not limited to the specific terms used, but rather includes all technical equivalents operating in a substantially similar manner to achieve a substantially similar result. One of skill in the art to which this application pertains would understand all the concepts and techniques discussed in a course book on compiler theory and operation. One such course book is A. Aho, R. Sethi and J. Ullman, *Compilers: Principles, Techniques and Tools*, published by Addision—Wesley, Reading, Mass., 1985, the terms and definitions of which are incorporated herein.

The invention provides a method for optimizing compiler intermediate representation (IR) code and provides data structures for implementing the method. Preferably, as shown in FIG. 1, the method is practiced using a conventional compiler computer program 8 operating on an electronic computer or data processor 2 with access to a memory storage means 4 such as a random access memory and access to a program mass storage means 6 such as an electronic magnetic disk storage device. Initially, the compiler program reads an input source program 10, such as a program written in the FORTRAN programming language, stored in the program mass storage means, and creates a dynamic single assignment intermediate representation (DSA IR) 12 of the source program in the memory using pseudo-machine instructions in the following manner.

A. Instruction Dependence Analysis and Single Assignment

To achieve a maximally parallel program representation for an ILP compiler, elimination is necessary of all instruction dependencies that are not essential for ensuring correct semantics. As is known in the art and disclosed in H. Zima & B. Chapman, *Super-compilers for Parallel and Vector Computers*, ACM Press, New York, instruction inter-dependencies can be classified as true dependencies, anti-dependencies and output dependencies. Only true dependencies are essential for semantic correctness. Anti-dependencies and output dependencies are consequences of assigning results of multiple operations to the same variable, a consequence never encountered when the invention is used.

In a parallel compiler intermediate representation (IR), anti-dependencies and output dependencies can be eliminated by causing the compiler never to assign a result to a virtual register more than once. This "single assignment" principle is disclosed in L. Tesler & H. Enea, "A Language Design for Concurrent Processes," Proceedings AFIPS Spring Joint Computer Conference (1968), pp. 403–408. Single assignment can be implemented in a single basic block of code using the value numbering procedure disclosed in the A. Aho course book cited above.

As is known in the art, a compiler can produce an static single assignment IR of a source program by creating or establishing a discrete virtual register 14 in the memory 4 each time an assignment operation is placed in the IR. In a static single assignment IR, each virtual register appears in the program exactly once on the left-hand side of an assignment. However, if such assignments occur in a loop construct, multiple loop iterations will cause multiple assignments to be made to the same virtual registers. Such multiple assignments violate the principles of dynamic single assignment and cause anti-dependences to arise between operations in the loop. Moreover, it is impossible to distinguish between the multiple definitions of a particular virtual register, thereby making it impossible to precisely specify dependencies. Thus, those skilled in the art would appreciate an IR which overcomes these problems by permitting single assignment in a dynamic sense.

B. Dynamic Single Assignment

One way to enhance parallelism and to overcome the problems of using static single assignment in loop constructs is by placing an IR in a dynamic single assignment (DSA) form.

As shown in FIG. 3, IR optimization in the compiler 8 uses a process beginning at block 60. One aspect of the invention is an IR optimization method step 62 defined herein as dynamic single assignment (DSA) and detailed in FIG. 4. When an IR is prepared with the DSA method, the same virtual register is never assigned to more than once on any dynamic execution path, even though the IR code, read literally, has multiple assignment statements with the same virtual register on the left hand side. The situation is exactly the opposite with static single assignment; a virtual register is never found more than once on the left hand side of a statement but, within a loop, that virtual register must necessarily be assigned to multiple times.

In the present invention, the input source program 10 is converted into the dynamic single assignment IR 12 using three basic tools: an expanded virtual register (EVR) data structure; a remap() function; and a memory map comprising a plurality of map tuples. These tools are used to carry out the steps of FIG. 3.

As shown in FIG. 2(A), an EVR data structure 36 preferably comprises an infinite, linearly ordered set of virtual register elements 38, 40, 42, with a special operation 30, "remap()," defined upon it. The sole parameter of the remap() function is an EVR name. If an EVR is named t, then the elements of the EVR can be addressed, read, and written as t[n], where n is any integer. For convenience, a first element t[0] may be referred to as t. Calling the remap(t) function causes whatever element was accessible as t[n] prior to the remap(t) operation to be accessible as t[n+1] after the remap(t) operation. The label t is used herein to intentionally correspond to the virtual register names of Code Blocks 3B to 3F below.

In practice, the remap() function causes one element of an expanded virtual register to be accessible using the EVR name of a different element. If remap(t) is executed between successive assignments of results to an EVR t, the previous value assigned to t will be at t[1] and the current assignment will be to a different element t[0]. FIG. 2(B) illustrates this operation with a side-by-side comparison of an IR code segment 50, the contents of element t[0] labeled 52, and the contents of element t[1] at 54. When the instruction [t=2] is encountered by an optimizer, an expression is added to the optimizer IR output in which the value [2] is stored in element t[0]. A remap(t) function is then added to the IR output. The remap function moves the contents of t[0] to t[1], as shown by arrow 53. The instruction [t=6] then causes the value [6] to be stored in t[0]. Although textually it appears that t[0] is being assigned results repeatedly, the single assignment rule is dynamically observed by storing to a different EVR element and real memory location on each occasion.

The remap() function is added to the DSA IR 12 during optimization and conversion of the source program into an IR, as shown in FIG. 3 block 64. One remap() statement is added before each assignments in the IR.

Use of EVRs and the remap() function to achieve dynamic single assignment with software loops is shown in Code Blocks 3A to 3F and FIG. 4.

Code Block 3A shows a simple loop in the FORTRAN language; by way of example, Code Block 3A could form a part of the source program 10 input to the compiler 8 incorporating the present invention.

Code Block 3B is a corresponding sequential IR of the loop of Code Block 3A, prepared in step 72.

Code Block 3C is a single assignment IR of code block 3A and step 74.

Code Block 3D is a canonical dynamic single assignment IR for the sequential IR of Code Block 3B, obtained by inserting a remap() operation before each assignment in the loop body, as shown in step 76.

Code Block 3E presents Code Block 3D in DSA form after moving all the remap operations to the beginning of the loop (step 78).

Code Block 3F shows Code Block 3E after performing copy optimization (step 79).

| Code Block 3A (FORTRAN Loop) | Code Block 3B (Sequential IR) | |
|---|---|---|
| | | % t00 = 0, t01 = 1 |
| | | % t02 = 5, t03 = 50 |
| K = 0 | s0 | t04 = copy(t00) |
| J = 1 | s1 | t05 = copy(t01) |
| DO 10 I = 1, 50 | s2 | t06 = copy(t01) |
| L = J | s3 | t07 = copy(t05) |
| J = J + K | s4 | t05 = iadd(t05,t04) |
| K = L | s5 | t04 = copy(t07) |
| 10 CONTINUE | s6 | t06 = iadd(t06,t01) |
| | s7 | t08 = ile(t06,t03) |
| | s8 | brt(t08,s03) |
| K = J + 5 | s9 | t9 = iadd(t5,t2) |
| | Code Block 3C | |
| | (Static Single Assignment IR) | |
| | | % t00 = 0, t01 = 1 |
| | | % t02 = 5, t03 = 50 |
| K = 0 | s0 | t04 = copy(t00) |
| J = 1 | s1 | t05 = copy(t01) |
| DO 10 I = 1, 50 | s2 | t06 = copy(t01) |
| | s10 | t10 = 0 (t04, t14) |
| | s11 | t11 = 0 (t05, t13) |
| | s12 | t12 = 0 (t06, t15) |
| L = J | s3 | t07 = copy(t11) |
| J = J + K | s4 | t13 = iadd(t11,t10) |
| K = L | s5 | t14 = copy(t07) |
| 10 CONTINUE | s6 | t15 = iadd(t12,t01) |
| | s7 | t08 = ile(t15,t03) |
| | s8 | brt(t08,s10) |
| K = J + 5 | s9 | t9 = iadd(t13,t02) |
| | Code Block 3D | |
| | (Canonical Dynamic | |
| | Single Assignment) | |
| | | % t0 = 0, t1 = 1 |
| | | % t2 = 5, t3 = 50 |
| K = 0 | s0 | t4 = copy(t0) |
| J = 1 | s1 | t5 = copy(t1) |
| DO 10 I = 1, N | s2 | t6 = copy(t1) |
| | s10 | remap(t7) |
| L = J | s3 | t7 = copy(t5) |
| | s11 | remap(t5) |
| J = J + K | s4 | t5 = iadd(t5[1],t5[2]) |
| | s12 | remap(t4) |
| K = L | s5 | t4 = copy(t7) |
| | s13 | remap(t6) |
| 10 CONTINUE | s6 | t6 = iadd(t6[1],t1) |
| | s14 | remap(t8) |
| | s7 | t8 = ile(t6,t3) |
| | s8 | brt (t8,s10) |
| | s9 | t9 = iadd(t5,t2) |
| | Code Block 3E | |
| | (After Moving REMAP()s) | |
| | | % t0 = 0, t1 = 1 |
| | | % t2 = 5, t3 = 50 |
| K = 0 | s0 | t4 = copy(t0) |
| J = 1 | s1 | t5 = copy(t1) |
| DO 10 I = 1, N | s2 | t6 = copy(t1) |
| | s10 | remap(t7) |
| | s11 | remap(t5) |
| | s12 | remap(t4) |
| | s13 | remap(t6) |
| | s14 | remap(t8) |
| L = J | s3 | t7 = copy(t5) |
| J = J + K | s4 | t5 = iadd(t5[1],t5[2]) |
| K = L | s5 | t4 = copy(t7) |
| 10 CONTINUE | s6 | t6 = iadd(t6[1],t1) |

-continued

```
         s7         t8 = ile(t6,t3)
         s8         brt (t8,s10)
         s9         t9 = iadd(t5,t2)
         Code Block 3F
         (After Copy Optimization)
                    % t0 = 0, t1 = 1
                    % t2 = 5, t3 = 50
         s0         t4 = copy(t0)
         s1         t5 = copy(t1)
         s2         t6 = copy(t1)
         s11        remap(t5)
         s13        remap(t6)
         s14        remap(t8)
         s4         t5 = iadd(t5[1],t5[2])
         s6         t6 = iadd(t6[1],t1)
         s7         t8 = ile(t6,t3)
         s8         brt (t8,s10)
         s9         t9 = iadd(t5,t2)
```

Except for the initialization steps in the first five lines, each line of Code Blocks 3B to 3F corresponds to a line of source code in Code Block 3A. The sources and destinations for all the operations are virtual registers 14 stored in the memory 4 and labeled t1 to t10. As is known in the art, the "iadd" instructions of the above Code Blocks represent CPU integer add operations, the "ile" instruction is an integer less-than-or-equal-to comparison, the "brt" instruction is a "branch if true" operation. The loop of Code Block 3A requires that the IRs use statement numbers s0 to s14 to enable branch references to the numbered statements.

The sequential intermediate representation of Code Block 3B is prepared in step 72 and includes several instances of assignments to the same virtual register. For example, virtual registers t04 and t06 are twice assigned to in Block 3A. Register t4 has assignments in statements s0 and s5; register t5 is assigned in statements s1 and s4; and register t6 is referenced in statements s2 and s6. As noted above, this is undesirable because it introduces anti-dependences, preventing parallelism.

Repeated assignments to the same virtual register can be eliminated using the static single assignment IR of Code Block 3C prepared in step 74. However, more virtual registers are required, and Code Blocks 3B and 3C have the same number of load operations.

Anti-dependences and repeated assignments can both be removed using the canonical DSA form of Code Block 3D, prepared in step 76, by replacing the references to t4, t5 and t6 on the left hand side of statements s0 through s2 by references to t4[1], t5[1] and t6[1]. A remap() operation is inserted in the IR of Code Block 3D before each assignment to a virtual register. Insertion of the remap operation for t5 prior to use of t5 in statement s4 requires changing the reference to t5 on the right side of s4 to t5[1]. Likewise, statement s6 is altered to use t6[1]. However, Code Block 3D still violates static single assignment rules because t4, t5, and t6 each appear twice on the left side of a statement.

Therfore, a further formal transformation is preferably done, as shown in step 78, by moving all the remap() operations to the beginning of the loop body, resulting in the IR of Code Block 3E. By moving the remap()s for t4 and t5 ahead of statements s4 and s3, the right side references change to t4[1] and t5[1].

Next, copy optimization can be done in step 79 in manner known in the art, by eliminating extraneous copy operations. Code Block 3E can be transformed to the copy-optimized Code Block 3F by noting that t7 always has the same value as t5[1], and t4[1] always has the same value as t7[1] which, in turn, has the same value as t5[2]. After substituting t5[1] and t5[2] for t7 and t4, respectively, statements s3 and s5 of Code Block 3E are dead code and may be omitted in Code Block 3F. As a result, statements s10 and s12 are unnecessary. Statement s4 of Code Block 3E effectively says that the result of the addition on this iteration is the sum of the results of the same statement on the prior two iterations. This notation enables expressing Code Block 3B in a shorter, more efficient manner.

C. Analysis of Subscripted Array Variables

Subscripted array variable references can be optimized according to the invention by causing a compiler to treat an array reference exactly like a scalar variable reference. As is known in the art, an element of an array such as X(I,J) is no different from a scalar variable except that the same array element memory location can be referenced in many different ways, for instance, as X(I,J), X(I+1,J−1) or X(L,M). For the appropriate values of I,J,L and M, all three references refer to the same memory location.

After establishing DSA form in FIG. 3 step 62 through the steps of FIG. 4, compiler array reference optimization can be effected by dependence analysis, as shown in step 67 of FIG. 3. Dependence analysis is done using the data flow analysis steps of FIGS. 6 and 7. An important step is causing the compiler to recognize that two references refer to the same memory location, as tested in FIG. 6. If the compiler knows that X(I) is available at a given point in a program, just prior to an accumulation statement of the form I=I+1, then X(I−1) refers to the same memory location after the accumulation statement as X(I) before the accumulation statement.

Preferably, subscripts of all references to the same array are assumed to have been normalized in prior compiler steps so that the subscripts are in the form $aJ+b$, where a and b are loop invariant expressions and J is some scalar integer valued variable that is repeatedly modified within the loop. J is designated as the subscript variable for a subscript of the form $aJ+b$ (J will generally be the loop index). Subscripts of all references to the same array are preferably expressed in terms of the same variable J.

Within a loop, all definitions of subscript variables, such as J, preferably are of the form $J=J+k_i$, where the various $k_i$ are loop-invariant integer quantities. There may be multiple such definitions of a subscript variable within the loop.

Dependence Analysis of Subscripted References.

Figure 5:
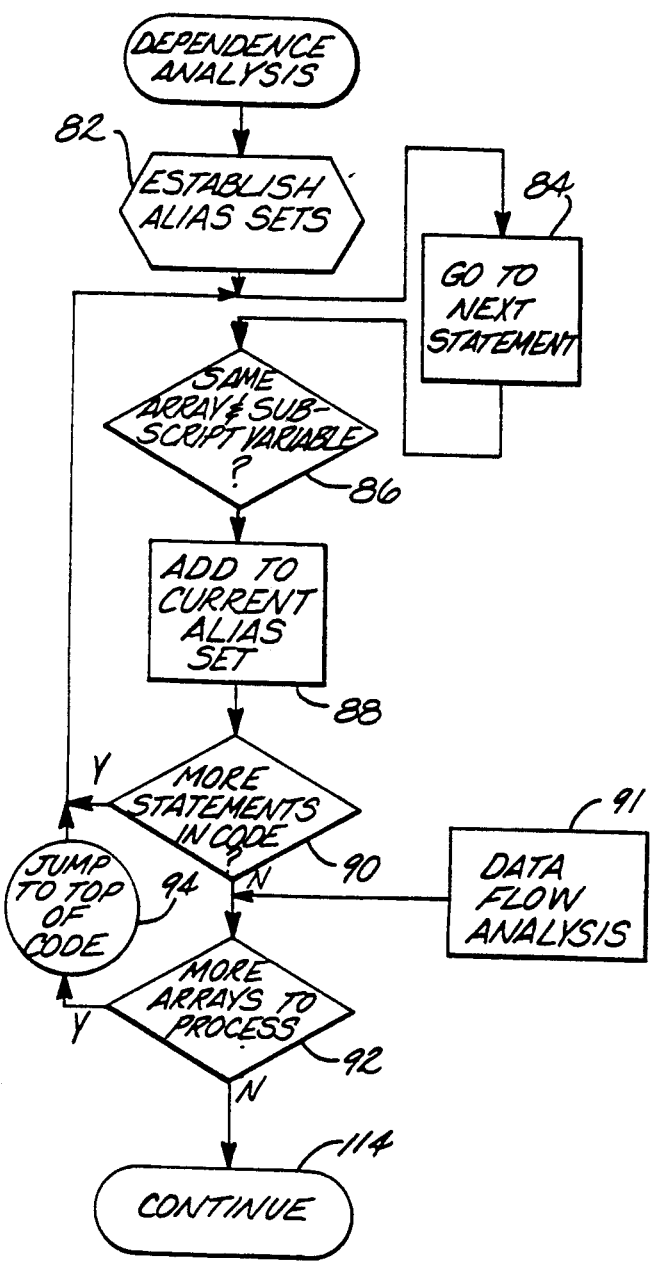
FIG. 5 is a flow diagram of dependence analysis and optimization forming a substep of the method of FIG. 3.

The array optimizing method of the invention includes conducting dependence analysis of subscripted references, as shown in block 67 and in FIG. 5.

Initially, sets of possibly aliased references are established (FIG. 5 block 82). All references that are or may be to the same array are placed in one set, as tested in block 86. Only one alias set is considered at a time so several passes through the code are done. This process is illustrated in the loop of steps 82 to 94.

Figure 6:
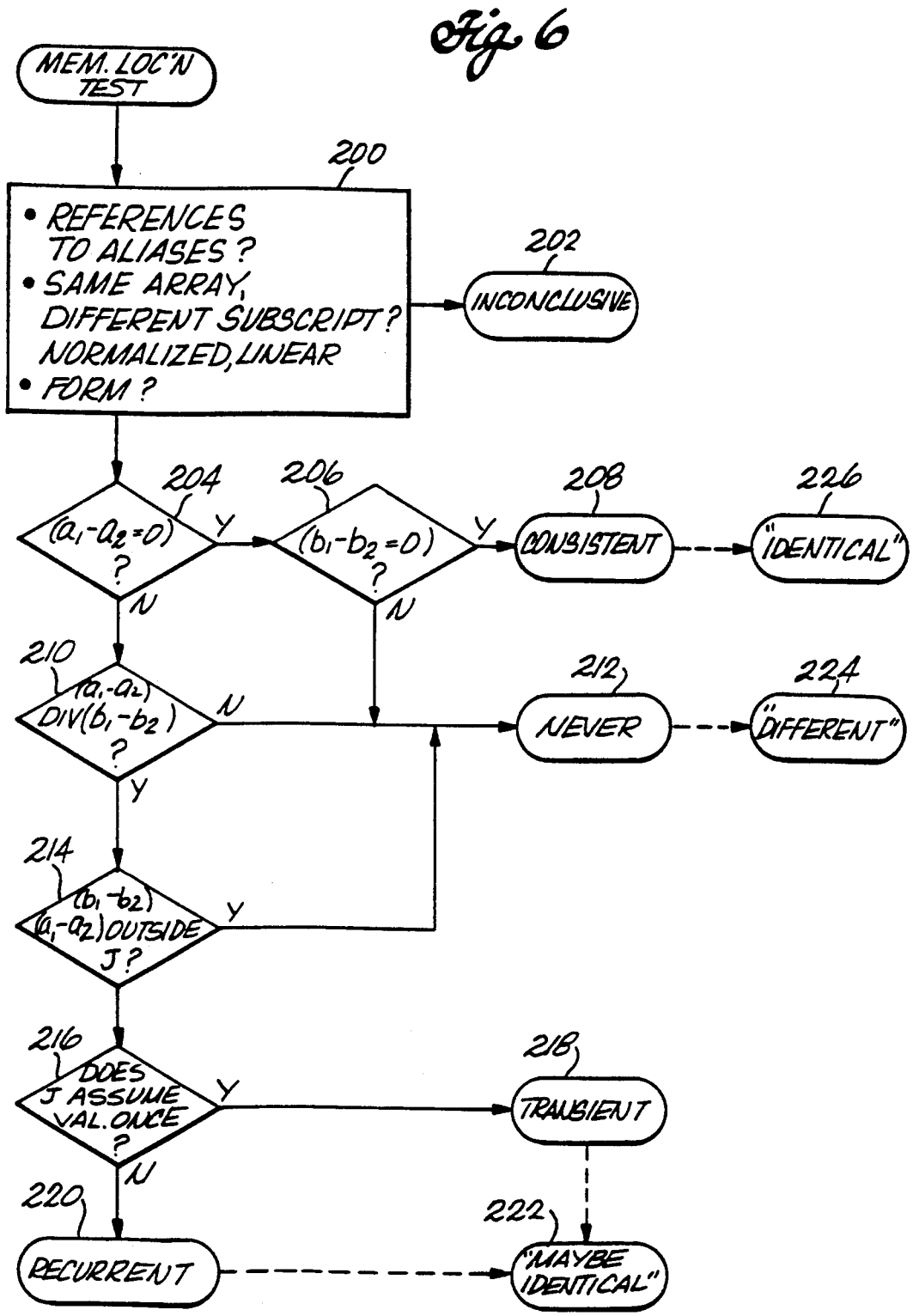
FIG. 6 is a flow diagram of a memory location consistency test forming a substep of the method of FIG. 3.

In the data flow analysis step 91 of FIG. 5, the method tests whether two array references relate to the same memory location, shown in detail in FIG. 6. If two subscripts $a_1J+b_1$ and $a_2J+b_2$ are in the same part of the program, to refer to the same location, $(a_1-a_2)J+(b_1-b_2)$ must be 0 for some integer value of J. If the method identifies two subscripted references $X(a_1J+b_1)$ and $X(a_2J+b_2)$ in the same neighborhood, the method next tests whether the two are to the same memory location. Five results are possible, as shown in FIG. 6 steps 204 to 226 and discussed below. (Although this discussion considers only single-dimensioned arrays, the method of the invention can also be used with multi-dimensional arrays, either by considering the subscript for each dimension separately or by considering the single subscript for the linearized array.)

1. Never equal. As shown in steps 204, 206, 210, 212, and 214, the two references are never the same location in at least three cases: first (steps 204, 206), $(a_1-a_2)=0$ but $(b_1-b_2)]0$; second (steps 204, 210), $(a_1-a_2)]0$ but $(a_1-a_2)$ does not divide $(b_1-b_2)$. Third (steps 204, 210, 214), $(a_1-a_2)]0$ and $(a_1-a_2)$ divides $(b_1-b_2)$ but $(b_1-b_2)(a_1-a_2)$ can be proven to be outside of the range of values that J assumes.

2. Always equal. Regardless of the value of J, the two references are to the same location if $(a_1-a_2)=0$ and $(b_1-b_2)=0$ (steps 204 to 208). Thus, the two references are textually identical.

3. Recurrently equal. There is one value of J for which the two references are to the same memory location if $(a_1-a_2)]0$, $(a_1-a_2)$ divides $(b_1-b_2)$ and $(b_1-b_2)(a_1-a_2)$ can be proven to be within the range of values that J assumes. Furthermore, J repeatedly takes on this value, as shown in steps 204, 210, 214, 216, 220.

4. Transiently equal. There is one value of J for which the two references are to the same memory location if $(a_1-a_2)]0$, $(a_1-a_2)$ divides $(b_1-b_2)$ and $(b_1-b_2)(a_1-a_2)$ can be proven to be within the range of values that J assumes. However, J assumes this value only once, as shown in steps 214 and 218. This is the expected result if J is the loop index.

5. Inconclusive. In some cases, the method cannot prove that the references fall in the above four categories. For example, as shown in steps 200 and 202, inconclusive results arise when the two references are to arrays that are possible aliases, the two references are to the same array but with different subscript variables, or when the difference of the two subscripts is not in the normalized, linear form.

In the method of the invention, the two memory locations are considered "different" in the first case (never) (step 224); "identical" in the second case (consistently equal) (step 226); and "possibly identical" in the remaining cases (step 222). References to different locations are independent, which permits parallel execution. References to consistently identical locations are always dependent, preventing parallelism but often providing opportunities for optimizing away loads and stores. The remaining three cases have little redeeming value because the result is not consistently predictable, and are classified as "possibly dependent."

Data Flow Analysis

Optimization according to the invention continues with data flow analysis, as shown in FIG. 7. As is known in the art, data flow analysis is done by constructing dataflow equations corresponding to and expressing program flow between individual basic blocks of code. To enable efficient optimization of subscripted references in an ILP compiler, the invention further comprises a compiler map in compiler processor memory. The compiler map describes the relationship at any point in the program, between memory locations and expanded virtual registers. Preferably, the map is stored in a data structure comprising a set of map tuples of the form $<X(f(I)), y[n]>$. The two elements of the map tuple are labeled the M-name and the R-name, respectively. A tuple indicates that the memory location that is addressable, at that particular point in the program, by the textual name, $X(f(I))$, is associated with the element of the expanded virtual register whose current name, at that same point in the program, is $t[n]$. A map tuple can be represented in memory by an integer pair.

Let S be a set of map tuples such that all the tuples in the set possess the same property, such as "the contents of the memory location $X(f(I))$ are currently available in the corresponding EVR element $t[n]$". Such a set may be manipulated by conventional data flow algorithms. However, after examining an IR statement in step 240, the method of the invention uses five special data flow analysis steps shown in FIG. 7:

1. Insertion and deletion of map tuples (steps 242-243). The map tuple $(X(f(J)), t[n])$ is deleted from S at each point in the program where there is a store to a memory location that is identical or possibly identical to the M-name $X(f(J))$. The map tuple $(X(f(J)), t[n])$ is inserted into the set S at each point in the program where a load operation loads $X(f(J))$ into $t[n]$ or a store operation stores $t[n]$ into the M-name $X(f(J))$.

2. Renaming of memory locations. As the compiler translates source code statements into IR expressions, the set S is propagated in the forward direction. When the compiler encounters a statement of the form $J=g(J)$ (step 244), all tuples $<X(f(J)) t[n]>$, whose M-name is a function of J, are deleted, as shown in step 246. If the function $g(.)$ is admissible (step 248), and forward flow analysis is occurring (step 249) then the tuple $<X(f(g^{-1}(J))), t[n]>$ is added to the set (step 250). Function $g(.)$ is defined as admissible only if it corresponds to incrementing or decrementing by some loop-invariant quality. For instance, if $X(J+5)$ is accessible before the statement $J=J+2$, then $X(J+3)$ is accessible after it, so $X(J)$ is admissible. Likewise, whenever the set S is propagated in the backward direction over a statement of the form $J=g(J)$, all tuples, $<X(f(J)), t[n]>$, whose M-name is a function of J, are deleted and, if the function $g(.)$ is admissible, the tuple $<X(f(g(J))), t[n]>$ is added to the set.

3. Renaming of expanded virtual register elements. Whenever the set S is propagated in the forward direction (step 254) past a statement of the form remap(t) (step 252), all tuples, $<X(f(J)), t[n]>$, whose R-name is an element of t, are replaced by the tuple $<X(f(J)), t[n+1]>$, as shown in step 258. Likewise, as shown in step 256, whenever the set S is propagated in the backward direction over a statement of the form remap(t), all tuples, $<X(f(J)), t[n]>$, whose R-name is an element of t, are replaced by the tuple $<X(f(J)), t[n-1]>$.

4. The meet operation (step 260). At a point in the program where n control flow paths meet, $S_i, i=1,n,n$, represent the sets propagating along these paths. The set S, just beyond the confluence of the paths, is constructed as follows. If the meet operation is conjunctive, a tuple with the M-name $X(f(J))$ is placed in S only if on every incoming path i there is a tuple of the form $<X(f(J)), ti>$ in the set $S_i$. In other words, identical M-names must arrive on each path for the M-name to propagate past the conjunctive meet. Furthermore, assuming this is the case, if the ti for all the matching incoming tuples are identical both in their EVR name and their index, the same R-name is placed in the outgoing tuple. Otherwise, a new EVR r is allocated in memory and r[0] is used as the M-name for the outgoing tuple. If the meet operation is disjunctive, every incoming tuple on any incoming path is placed in the outgoing set S.

Using these operations, map tuples from one program point are correctly propagated to another point in the program so that the comparison of two array subscripts can be performed at the same point in the program.

Thereafter, the method performs conventional data flow analysis by iteratively computing the values of the sets $S_i$ at all points of interest, until a stable solution is found. The set S at any point in the program specifies exactly which M-names are accessible in EVRs and in which specific EVR elements the contents of those memory locations are to be found.

One can question whether the iterative process of solving the flow equations will ever converge to a steady state. Given the renaming of M-names that occurs every time a statement of the form $I=g(I)$ is encountered, the set S could grow indefinitely as it is propagated through successive iterations of a loop. A windowing approach can prevent memory overflow, if applied after the five data flow analysis steps, at step 262.

For example, if the subscript variables change monotonically, i.e., I is only incremented or only decremented, runaway growth of a set S can be contained by restricting maximum and minimum values on the subscripts. Whenever an M-name, after renaming, falls outside of this window of values, that tuple is discarded from the set of map tuples. No useful information is lost if the window is defined to contain all textual references in the region of code being analyzed by the compiler. Once an M-name has moved outside the window, further propagation around the loop will only move it further outside the window, and it can never again be equal to any reference in the program. Hence, the M-name has no value and can be discarded. Thus, establishing a window permits "truncation" of the map tuple sets, causing the iterative process to converge to a solution.

If a window cannot be defined as above, an alternative is to iterate the map tuple sets around the loop some fixed number of times, N. This provides map tuple sets containing accurate information about the dependencies between iterations that are up to N apart. Beyond that, no information is available and, in the worst case, one could assume that every reference in one iteration is dependent upon every reference N iterations or more way. In operation, the methods disclosed herein can be applied to non-optimized code, in which each operation loads source operands from memory and deposits the result back in memory, to cause conversion of the code into DSA form with optimization of the memory loads.

To do so, during the data flow analysis described above, S is defined as the set of map tuples that list M-names which are accessible in known EVRs. Then, redundant loads are eliminated by substituting a known EVR element for the textual name in the IR load. Any load operation that specifies an M-name V that has a corresponding tuple $<V,v>$ in the map tuple set for that neighborhood can be eliminated, since the contents of that memory location are in a known EVR element. The operations that would have used the result of the load operation are changed to refer to the EVR element v.

To eliminate redundant store operations, an equivalent backward flow analysis can be used. For example, at points in the program with a store to variables that are "maybe equal" to V, all tuples with V as the M-name are deleted from the set S at that point in the program.

Data flow analysis continues with tuples added to and deleted from the set S as above. Once all statements have been processed, the set S at any point in the program specifies exactly which M-names are accessible in EVRs and in which specific EVR elements the contents of those memory locations are to be found.

Further description of the invention appears in a paper entitled "Data Flow and Dependence Analysis for Instruction-Level Parallelism," which is published in the Fourth International Workshop on Languages and Compilers for Parallel Computing, Springer Verlag, 1992, and incorporated by reference herein. Also, the invention can be practiced ways other than as specifically disclosed herein. Therefore, the scope of the invention should be determined only from the appended claims, in which:

What is claimed is:

1. A method for optimizing an intermediate representation output of an instruction level parallel processor compiler computer program, the compiler computer program and the method being performed by a data processor coupled to a memory, the method comprising the steps of
    (a) providing a source program as input to the compiler computer program,
    (b) creating in the memory a plurality of expanded virtual register data structures each comprising a plurality of separately addressable elements identified by an EVR name;
    (c) converting the source program into a single assignment intermediate representation comprising at least one assignment statement referencing an expanded virtual register data structure and storing the single assignment intermediate representation in the memory;
    (d) converting the single assignment intermediate representation to a dynamic single assignment intermediate representation created in the memory by
        (d1) outputting a remap() function in association with each assignment statement, wherein the remap() function receives an expanded virtual register as a parameter;
        (d2) moving al the remap() functions to a top of a basic block in the dynamic single assignment intermediate representation;
        (d3) removing redundant load operations in the dynamic single assignment intermediate representation by testing whether a first expanded virtual register element always refers to an identical location in the memory as a second expanded virtual register element, and if so, substituting the second expanded virtual register element for the first expanded virtual register element in the dynamic single assignment intermediate representation.

2. The method of claim 1, wherein the expanded virtual register data structures each comprise an unbounded linearly ordered plurality of storage elements in the memory.

3. The method of claim 2, wherein the remap() function accepts an expanded virtual register data structure as a parameter and causes a first element of the expanded virtual register previously accessible using a first name to be accessible using a second name.

4. The method of claim 1 wherein step (d) further comprises the substeps of
- (d4) creating a plurality of alias sets in the memory; and
- (d5) storing in an alias set all references in the dynamic single assignment intermediate representation unless the references are not to the same array and subscript.

5. The method of claim 4, wherein each expanded virtual register element is coupled in the memory to a textual name of a subscripted array variable in the intermediate representation, the coupled element and textual name comprising one of a plurality of map tuples in the memory, wherein a plurality of map tuples are associated in at least one map tuple set, and wherein step (d) further comprises the substep of examining an IR statement and, depending on the content of the statement, deleting a tuple from a set, adding a tuple to a set, replacing tuples in a set with a new tuple, and processing meets.

6. The method of claim 5, wherein step (d) further includes the substep of
- (d6) identifying whether two references at a point in the program relate to the same location in the memory consistently, never, transiently, recurrently, or inconclusively, and in response thereto, enabling elimination of redundant loads and stores and enabling changing the order of loads and stores.

7. The method of claim 6, wherein step (d) further comprises the substeps of
- (d7) accepting two input subscript references $a_1J+b_1$, $a_2J+b_2$ of the normalized form $aJ+b$, wherein a and b are loop invariant integer expressions and J is a scalar variable repeatedly modified in value during iterations of a software loop;
- (d8) testing whether $(a_1-a_2=0)$ and $(b_1-b_2=0)$, and if so designating the references as "consistently dependent";
- (d9) testing whether $((a_1-a_2=0)$ and $(b_1-b_2$ not $=0))$ or $((a_1-a_2$ not $=0)$ and $(a_1-a_2)$ divides $(b_1-b_2))$ or $((a_1-a_2$ not $=0)$ and $(a_1-a_2)$ divides $(b_1-b_2)$ and $(b_1-b_2)(a_1-a_2)$ is outside a range of J values, and if so, labeling the references "independent";
- (d10) testing whether J assumes its value only once during a loop, and if so labeling the references "transiently dependent";
- (d11) testing whether $((a_1-a_2$ not $=0)$ and $(a_1-a_2)$ divides $(b_1-b_2)$ and $(b_1-b_2)/(a_1-a_2)$ is outside a range of J values, and J assumes its value multiple times, and if so labeling the references "recurrently dependent".

8. The method of claim 7, further comprising the step of enabling the processor to execute fewer references and to execute the references in parallel.

9. The method of claim 1, wherein each expanded virtual register element is coupled in the memory to a textual name of a subscripted array variable in the intermediate representation, the coupled element and name comprising one of a plurality of map tuples in the memory.

10. The method of claim 9, wherein the map tuples are members of at least one map tuple set.

11. In a compiler computer program for an electronic instruction level parallel processor coupled to an electronic random access memory and to a source program in a magnetic mass storage means, the combination of
- means for creating a plurality of expanded virtual register (EVR) data structures in the memory, each EVR data structure comprising a linearly ordered plurality of virtual register elements;
- means for associating a textual name and a real memory location with an EVR element in the memory; and
- means for associating a plurality of the textual names with one of the elements.

12. The combination of claim 11, further including means in the compiler program for accessing the EVR data structure as a scalar variable, the virtual register elements being individually accessible.

13. The combination of claim 12, wherein the EVR data structure is responsive to a function "remap()" in the compiler program, the remap() function causing a value of one of the elements previously accessible using a first name to be accessible using a second name.

14. An optimizing method for an instruction level parallel compiler computer program, the compiler computer program and the method being performed by a data processor, the method comprising the steps of
- coupling the data processor to a memory means and a program mass storage means, in which a source program is stored;
- converting an input intermediate representation of the source program to a dynamic single assignment intermediate representation in which a plurality of assignment statements are output as a reduced plurality of statements, each statement in the reduced plurality referring to an expanded virtual register data structure; and
- eliminating copy operations from the intermediate representation during conversion to dynamic single assignment form.

15. The method of claim 14, further including the step of replacing duplicative register assignment references with references to one of a plurality of register elements in an expanded virtual register.

16. The method of claim 15, further comprising the substeps of
- accepting two input subscript references $a_1J+b_1$, $a_2J+b_2$ of the normalized form $aJ+b$, wherein a and b are loop invariant integer expressions and J is a scalar variable repeatedly modified in value during iterations of a software loop;
- testing whether $(a_1-a_2=0)$ and $(b_1-b_2=0)$, and if so designating the references as "consistently dependent";
- testing whether $((a_1-a_2=0)$ and $(b_1-b_2$ not $=0))$ or $((a_1-a_2$ not $=0)$ and $(a_1-a_2)$ divides $(b_1-b_2))$ or $((a_1-a_2$ not $=0)$ and $(a_1-a_2)$ divides $(b_1-b_2)$ and $(b_1-b_2)(a_1-a_2)$ is outside a range of J values, and if so, labeling the references "independent";
- testing whether J assumes its value only once during the loop, and if so labeling the references "transiently dependent"; and
- testing whether $((a_1-a_2$ not $=0)$ and $(a_1-a_2)$ divides $(b_1-b_2))$ or $((a_1-a_2$ not $=0)$ and $(a_1-a_2)$ divides $(b_1-b_2)$ and $(b_1-b_2)(a_1-a_2)$ is outside a range of J values, and J assumes its value multiple times, and and if so labeling the references "recurrently dependent".

17. The method of claim 16, further comprising the step of enabling the processor to execute fewer references and to execute the references in parallel.

18. The method of claim 17, wherein each expanded virtual register element is coupled in the memory to a textual name of a subscripted array variable in the intermediate representation, the coupled element and name comprising one of a plurality of map tuples in the memory.

19. The method of claim 18, wherein the register and textual name comprise one of a plurality of map tuples in memory, and wherein a plurality of map tuples are members of at least one map tuple set.

* * * * *